(12) United States Patent
Kanai et al.

(10) Patent No.: US 9,483,056 B2
(45) Date of Patent: Nov. 1, 2016

(54) VEHICLE CONTROL SYSTEM

(71) Applicant: HITACHI CONSTRUCTION MACHINERY CO., LTD., Tokyo (JP)

(72) Inventors: Masaki Kanai, Tokyo (JP); Tomoyuki Hamada, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/600,269

(22) Filed: Jan. 20, 2015

(65) Prior Publication Data

US 2015/0206433 A1  Jul. 23, 2015

(30) Foreign Application Priority Data

Jan. 21, 2014  (JP) ................................ 2014-008304

(51) Int. Cl.
*G08G 1/16* (2006.01)
*G05D 1/02* (2006.01)

(52) U.S. Cl.
CPC ............ *G05D 1/0297* (2013.01); *G08G 1/165* (2013.01); *G05D 2201/021* (2013.01)

(58) Field of Classification Search
CPC ........ G08G 1/16; G08G 1/161; G08G 1/165; G05D 1/02; G05D 2201/021; G05D 1/0297; E02F 9/2025; E02F 9/26; E02F 9/2045; A01B 79/005; A01B 69/008
USPC ........................................................ 701/1, 50
See application file for complete search history.

(56) References Cited

U.S. PATENT DOCUMENTS

| 6,067,031 | A | * | 5/2000 | Janky ..................... G08G 1/166 180/169 |
| 6,246,932 | B1 | | 6/2001 | Kageyama et al. |
| 6,292,725 | B1 | | 9/2001 | Kageyama et al. |
| 6,356,206 | B1 | * | 3/2002 | Takenaga ................ G01S 7/003 340/903 |
| 6,393,362 | B1 | | 5/2002 | Burns |
| 6,799,100 | B2 | | 9/2004 | Burns et al. |
| 7,010,425 | B2 | * | 3/2006 | Gray ..................... A01B 69/008 172/2 |

(Continued)

FOREIGN PATENT DOCUMENTS

| JP | 3424834 | 5/2003 |
| JP | 3458958 | 8/2003 |

OTHER PUBLICATIONS

Australian Office Action received in corresponding Australian Application No. 2015200254 dated Dec. 16, 2015.

*Primary Examiner* — Atul Trivedi
(74) *Attorney, Agent, or Firm* — Mattingly & Malur, PC

(57) ABSTRACT

A vehicle control system is provided in which, if a position requiring caution for the contact with an oncoming vehicle on a track road is found also on an ex-post facto basis, the information thereof is easily fed back to the control of each vehicle. This vehicle control system has a GPS receiver 101 for detecting the position of each vehicle, an encoder 72 and an IMU 73 mounted on each vehicle, a specific spot setting unit 87 for setting a position requiring caution for the passing with an oncoming vehicle as a specific spot on the basis of a vehicle position, a slip ratio and a curvature that are computed from the values output therefrom, and a storage device for storing the positional information on a place set as a specific spot by a specific spot detecting unit.

4 Claims, 13 Drawing Sheets

(56) References Cited

U.S. PATENT DOCUMENTS

| | | | | |
|---|---|---|---|---|
| 7,158,051 B2 * | 1/2007 | Strumolo | ............... | B60Q 9/008 180/167 |
| 8,095,279 B2 * | 1/2012 | Greiner | ............... | G06Q 10/047 340/439 |
| 8,099,217 B2 * | 1/2012 | Greiner | ............... | G05D 1/0297 340/439 |
| 8,175,796 B1 * | 5/2012 | Blackburn | ............. | G08G 1/161 340/902 |
| 9,164,955 B2 * | 10/2015 | Lavoie | ............... | G06F 17/00 |
| 2006/0195231 A1 * | 8/2006 | Diebold | ............... | B60R 21/013 701/1 |
| 2010/0253492 A1 * | 10/2010 | Seder | ............... | G01S 13/723 340/435 |
| 2012/0215410 A1 * | 8/2012 | McClure | ............. | A01B 79/005 701/50 |
| 2012/0232779 A1 * | 9/2012 | Koehrsen | ........... | G05B 19/4061 701/301 |
| 2013/0006482 A1 * | 1/2013 | Hukkeri | ............... | G01C 7/04 701/50 |
| 2014/0156153 A1 * | 6/2014 | Faivre | ................ | G07C 5/0841 701/50 |
| 2014/0371947 A1 * | 12/2014 | Stratton | ................ | G01C 7/04 701/1 |

* cited by examiner

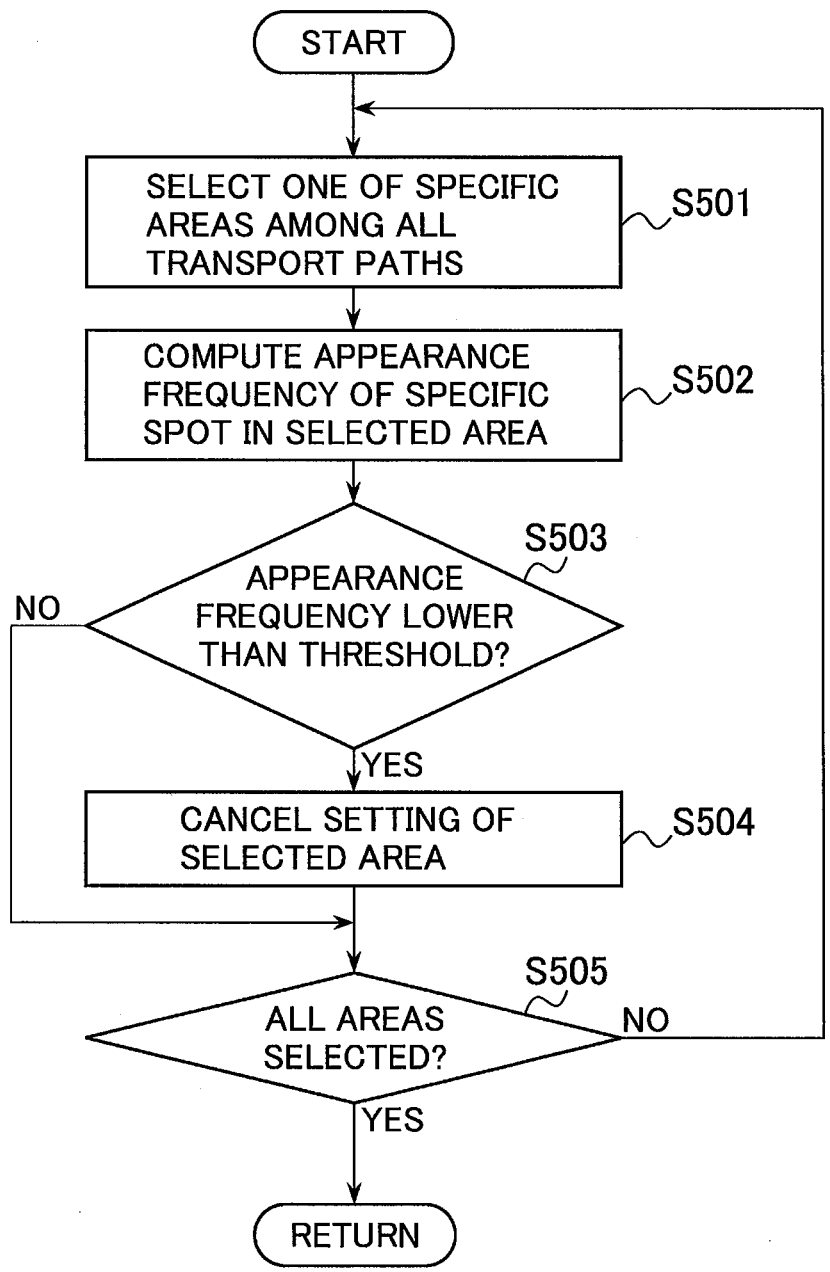

VEHICLE CONTROL SYSTEM

BACKGROUND OF THE INVENTION

1. Field of the Invention

The present invention relates to a vehicle control system intended to provide control such that a plurality of vehicles will not collide.

2. Description of the Related Art

Operating a plurality of vehicles in an unattended manner, such as dump trucks carrying ores excavated at open pit mines for example, requires to provide control such that vehicle will not come into contact with each other. Especially, when vehicles pass each other on a two-lane road with no center median, if the vehicle traveling on one lane strays onto the other lane (the opposite lane), the straying vehicle may touch the vehicle on the other lane. Accordingly, the prevention of the contact between vehicles passing each other has been an important issue.

Conventional methods of preventing the contact at passing include one in which collision is avoided by steering control by detecting the oncoming vehicle through an on-board external sensor and a method in which a control station is arranged for monitoring the movements of a plurality of vehicles in wireless communication, the control station giving information such as the position of the oncoming vehicle at the time of passing, thereby supporting safe passing.

JP No. 3424834 discloses a technology in which the control station grasps the self-location of each of the vehicles in a wireless manner and transmits information for identifying an vehicle that is expected to pass a mate vehicle to the identifying vehicle, each of these vehicles identifying each other by transmitting this information by vehicle-to-vehicle communication, thereby understanding the position of the mate vehicle. This patent also discloses a technology in which both vehicles concerned reduce the speed thereof in a segment in which the vehicles are expected to pass each other.

Moreover, JP No. 3458958 discloses a technology in which each of the vehicles has an obstacle sensor based on radio or the like and, if the approaching of another vehicle is detected through this obstacle sensor, a host vehicle pulls over to a berm to let the oncoming vehicle pass.

SUMMARY OF THE INVENTION

It should be noted here that a track road that is allocated to each vehicle as a target traveling route has locations at which each vehicle should look out for the possibility of contact with an oncoming vehicle at the time of passing, these locations including such locations as will be found to be these locations only after actually doing traveling.

For example, because the centrifugal force actually acting on a host vehicle is greater than expected while traveling in a certain curve of a road, the possibility for the host vehicle to enter the opposite lane (the track road of an oncoming vehicle) may be found to be greater than expected; on the contrary, because the actual centrifugal force in another curve is found smaller than initially expected, and hence the vehicle speed is lowered more than necessary, it may be found that the operational efficiency is expected to be better as a result of the improvement of the vehicle speed. For example, in the traveling management of mining dump trucks, track roads of trucks are frequently changed as mining work progresses. In such a case, it is difficult to add posterior measures every time the change is done.

In another example, road surfaces are wetted by rainfall to make roads locally slippery, thereby sometimes increasing the possibility that the host vehicle could enter the opposite lane. Especially, dump trucks often travel on unpaved roads, and it can be pointed out that the dump trucks are easily affected by weather changes.

It should be noted that the two documents mentioned above do not especially address these problems. Hence, if a location that requires caution for vehicle-to-vehicle contact at passing is found on a postmortem basis, it is estimated to require fair amount of time and labor to feedback the finding to the travel control of each vehicle.

It is therefore an object of the present invention to also provide a vehicle control system that can easily feedback information thereof to each vehicle even when a location requiring caution for the contact with an oncoming vehicle on a track road has been found ex post facto.

In order to achieve the object, there is provided a vehicle control system for controlling a plurality of vehicles traveling along a plurality of track roads. This vehicle control system has a plurality of position detecting devices installed on each of the plurality of vehicles and configured to detect a position thereof; a plurality of parameter detecting devices installed on each of the plurality of vehicles and configured to detect a parameter indicative of the possibility for a vehicle installed with the position detecting device traveling on one of two adjacent track roads in a two-way traffic area formed by the two adjacent track roads different in vehicle traveling direction to enter the other of the two adjacent track roads; a specific spot setting unit configured to execute, on the basis of positions of the plurality of vehicles output from the plurality of position detecting devices, parameters output from the plurality of parameter detecting devices, and thresholds related with the parameter concerned, processing for setting a position at which the parameter concerned has been output as a specific spot; and a storage device configured to store positional information on a place set as a specific spot by the specific spot detecting unit.

As described above and according to the present invention, when even a location requiring caution for the contact with an oncoming vehicle on a traveling course has been found ex post facto, the information thereof can be fed back to each vehicle.

BRIEF DESCRIPTION OF THE DRAWINGS

FIG. 13 is a flowchart indicative of processing for the control-side computer 6 to automatically cancel the setting of a specific area.

DESCRIPTION OF THE PREFERRED EMBODIMENTS

Figure 1:
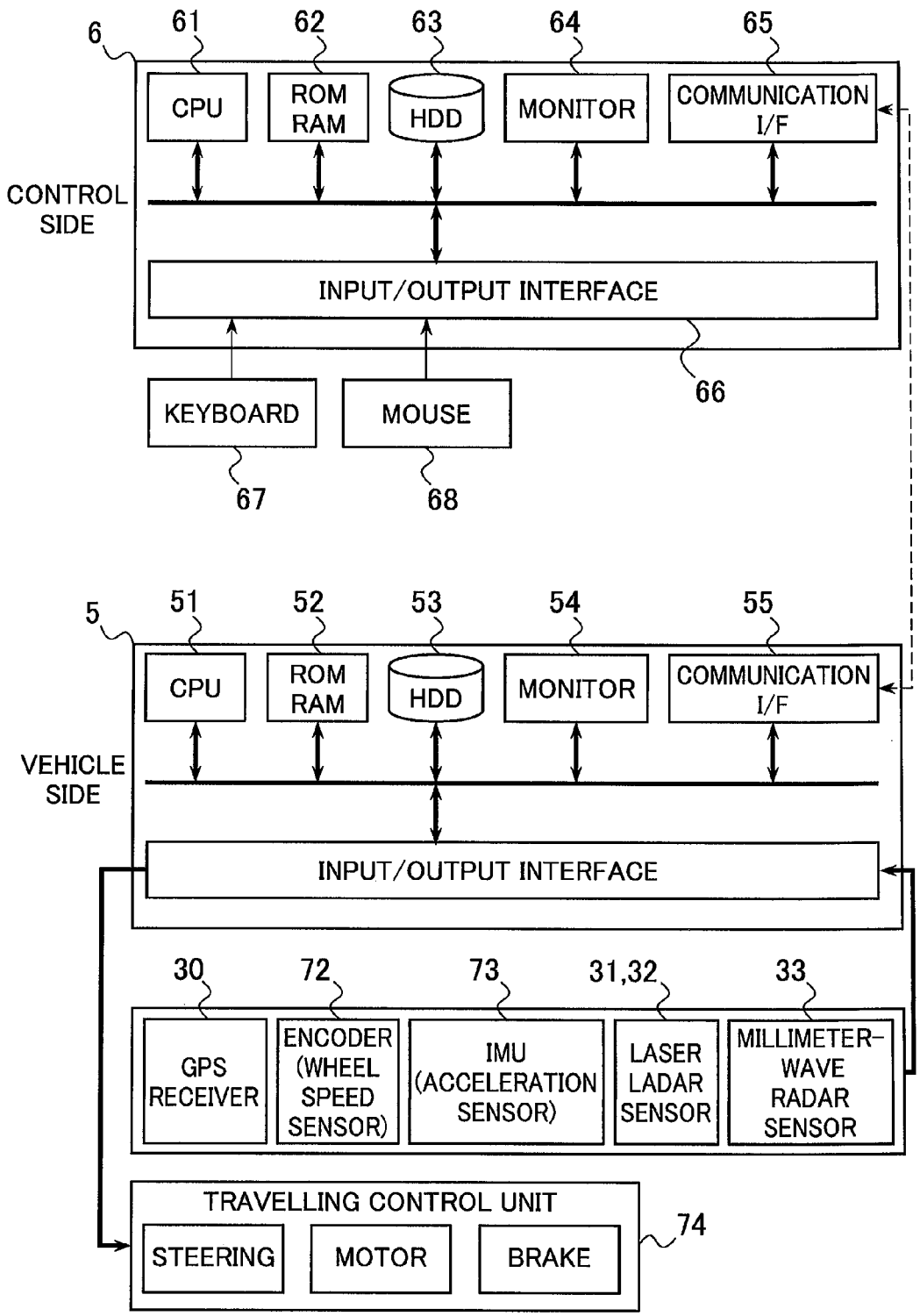
FIG. 1 is schematic configuration diagram illustrating a vehicle control system according to a first embodiment of the present invention.

As will be described later in detail, in each of embodiments of the present invention, a vehicle control system for controlling a plurality of vehicles traveling along a plurality of track roads has a plurality of position detecting devices installed on each of the plurality of vehicles and configured to detect a position thereof; a plurality of parameter detecting devices installed on each of the plurality of vehicles and configured to detect a parameter indicative of the possibility for a vehicle installed with the position detecting device traveling on one of two adjacent track roads in a two-way traffic area (referred to as "two-way traffic area" in some cases) formed by the two adjacent track roads different in vehicle traveling direction to enter the other of the two adjacent track roads; a specific spot setting unit configured to execute, on the basis of positions of the plurality of vehicles output from the plurality of position detecting devices, parameters output from the plurality of parameter detecting devices, and thresholds related with the parameter concerned, processing for setting a position at which the parameter concerned has been output as a specific spot; and a storage device configured to store positional information on a place set as a specific spot by the specific spot detecting unit.

Consequently, each vehicle traveling is made to collect parameters through the parameter detecting device to make a comparison between the collected parameters and the threshold, thereby allowing the detection of points (specific spots) that require caution for the contact with oncoming vehicles on a track road and the storing of the positional information on these specific spots into the storage device. Even if specific spots occur or are found only after actually running each vehicle, it is possible to easily give feedback of the positional information to the control of each vehicle.

In addition, it is preferable for the vehicle control system to have a specific area setting unit configured to set, on the basis of the positional information on each specific spot stored in the storage device, a specific area serving as a closed area set over the two track roads in the two-way traffic area, the specific area being an area where the traveling of other vehicles in the closed area is restricted while one of the plurality of vehicles is traveling in the closed area.

Consequently, on the basis of the positional information on specific spots stored in the storage device, a specific area is set over the two track roads in the two-way traffic area and, while a vehicle is traveling in the specific area, the traveling of other vehicles in the specific area is restricted. The number of vehicles traveling in the specific area hence is always limited to one, thereby preventing the collision between a vehicle and an oncoming vehicle in the specific area.

It is preferable the plurality of track roads be divided into multiple segments. And the storage device should store the information on time at which the parameters were detected by the plurality of parameter detecting devices along with the positional information on the specific spot. It is further preferable for the specific area setting unit to set as the specific area two following types of segments: one or more segments in which the number of times that the specific spots are set within a predetermined period of time has exceeded a threshold, the one or more segments being related with the two track roads in the two-way traffic area among the plurality of segments; and another segment arranged beside the one or more segments in which the threshold has been exceeded, the segment being related with the other of the two track roads in the two-way traffic area among the plurality of segments.

Consequently, of the plurality of segments, a first segment in which the number of times specific spots are set within a predetermined period of time has exceeded a threshold and a second segment adjacent to the first segment on another track road are automatically set by the specific area setting unit as specific segments. The operators accordingly do not need to set specific areas while checking the positional information on specific spots, thereby allowing the further saving of time and labor required for feeding back the information on specific spots to the travel control of each vehicle.

Moreover, the parameters preferably include at least one of slip ratio of the plurality of vehicles, curvature of the plurality of track roads, and distance from the plurality of vehicles to the berm on which the vehicles are traveling. The parameter detecting device includes a vehicle speed sensor and a wheel speed sensor for use in the computation of slip ratios, an acceleration sensor for use in the computation of centrifugal force, and a laser radar sensor or a stereo camera for use in the computation of the distances from both berms on which the host vehicle is traveling to the host vehicle, for example.

Furthermore, it is preferable to further arrange a traveling permitted segment setting unit configured to allocate, as a traveling permitted segment, at least one segment of the plurality of segments to the respective vehicles without overlapping with other vehicles in accordance with the track road and position of each of the plurality of vehicles. It is preferable that, if one of the plurality of vehicles is found in a segment related with the two track roads in the specific area among the plurality of segments, the traveling permitted segment setting unit set the segment related with one of these two track roads as the traveling permitted segment for this one vehicle and exclude a segment related with the other track road of the two track roads in the specific area among the plurality of segments from a traveling permitted segment of the other vehicles except the one vehicle among the plurality of vehicles.

Consequently, if a vehicle is found in a segment related with one track road in a specific area, the segment related with this one track road is set as a traveling permitted road for the vehicle and the segment related with the other track road in this specific traveling area is excluded from the traveling permitted areas of other vehicles. Since the number of vehicles traveling in the specific area is limited to one to eliminate the necessity for two-way traffic, the collision between the vehicle and the oncoming vehicle are prevented in the specific area.

Further, it is preferable for the traveling permitted segment setting unit to set a segment related with the other track road of the two track road in the specific area as a traveling permitted segment for the one vehicle present in a segment related with one of the two track roads in the two-way traffic area.

Consequently, the vehicle traveling in the segment related with the one track road is given the traveling permission also for the segment related with the other track road. Even if the vehicle traveling on the one track road enters the other track road, the vehicle can easily return to the original route (namely, the one track road).

The following specifically describes the vehicle control system according to one embodiment of the present invention with reference to the accompanying drawings. In what follows, embodiments in which mining dump trucks (vehicles) traveling in an unattended manner are controlled by a computer (a control-side computer 6) arranged in a building of a control station.

First Embodiment

FIG. 1 shows a schematic configuration diagram illustrating a vehicle control system according to the first embodiment of the present invention. The vehicle control system shown in FIG. 1 has a vehicle-side computer 5 installed on a dump truck equivalent to a vehicle and a control-side computer 6 arranged in the building of the control station.

The vehicle-side computer 5 has a CPU (Central Processing Unit) 51 that works an arithmetic processing unit for executing various programs, a semiconductor memory (ROM, RAM, flash memory or the like) 52 and a hard disk drive (HDD) 53 as a storage device for storing the various programs and various types of data, a monitor (a display unit) 54 for displaying the results and the like of processing done by the CPU 51, a communication interface 55 for wireless communication with other computers, and an input/output interface 56 for controlling input/output of data and commands to/from units in or out of the vehicle-side computer 5.

The input/output interface 56 is connected to a GPS receiver 30, an encoder (a wheel speed sensor) 72 for detecting wheel rotary direction and wheel rotary amount, an inertial measurement unit (IMU) for detecting three-dimensional angular speed and acceleration, laser radar sensors 31 and 32, and a millimeter-wave radar sensor 33, which are serving as sensors outputting signals to the vehicle-side computer 5. The input/output interface 56 is also connected to a unit (including steering system, traveling electric motors for driving rear wheels, a brake for braking the dump truck, and the like, for example, which are generically referred to as a travel control unit 74) for controlling the autonomous traveling of the dump truck, the unit operating on the basis of signals output from the vehicle-side computer 5.

Like the vehicle-side computer 5, the control-side computer 6 has a CPU 61, a semiconductor memory 62 and a HDD 63, a monitor 64, a communication interface 65, and an input/output interface 66. The input/output interface 66 is connected to a keyboard 67 and a mouse 68 through which signals are output to the control-side computer 6. The keyboard 67 and the mouse 68 are used to set specific areas, display dump truck status, and enter commands to the dump truck. It should be noted that the keyboard 67 and the mouse 68 may be configured as input devices that appear on the screen of the display unit (the monitor 64) of the control-side computer 6.

The vehicle-side computer 5 and the control-side computer 6 carry out information communication with each other through the communication interfaces 55 and 65. It should be noted that there are actually a plurality of dump trucks, which means there are also a plurality of vehicle-side computers 5. Each of these vehicle-side computers 5 communicates with the control-side computer 6 in a wireless manner. Because these vehicle-side computers 5 are the same in configuration, only one of them is shown.

Figure 2:
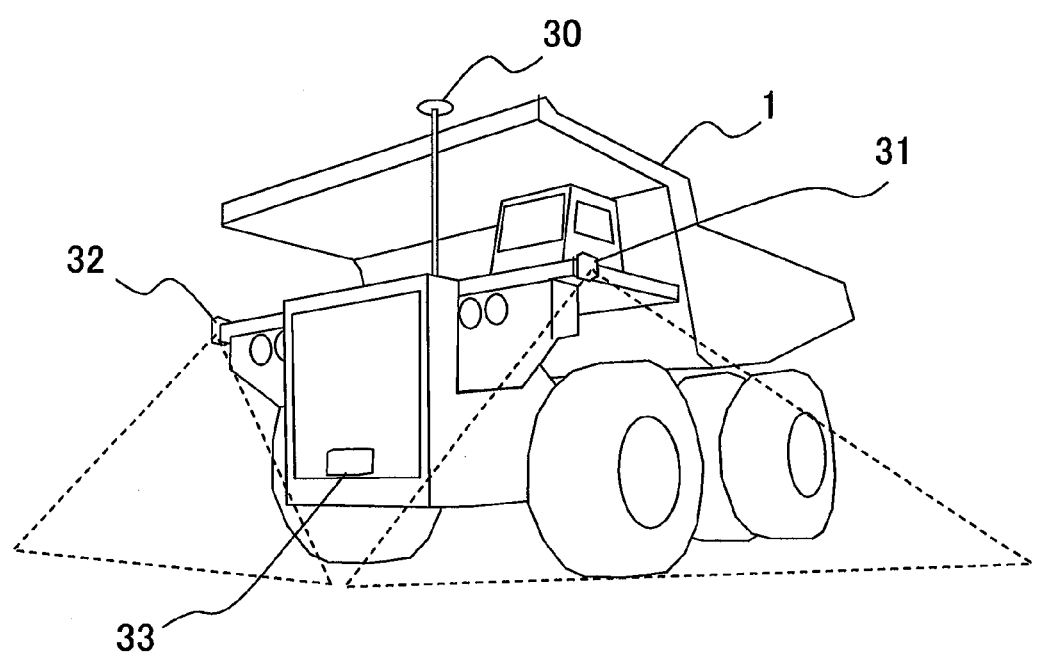
FIG. 2 is a hardware configuration diagram illustrating a dump truck according to the first embodiment of the present invention.

FIG. 2 shows a hardware configuration of a dump truck according to the first embodiment of the present invention. The dump truck shown in this figure has a receiver (an antenna) 30 for GPS (Global Positioning System), laser radar sensors 31 and 32, and a millimeter-wave radar sensor 33 mounted on the front of the vehicle.

The vehicle-side computer 5 identifies self-location of the dump truck by use of navigation signals from received by the GPS receiver 30 from a GPS satellite. The laser radar sensors 31 and 32 are used to detect the berm positions of a road on which the dump truck travels. The millimeter-wave radar sensor 33 is used to detect obstacles ahead of the dump truck.

It should be noted that means of identifying the self-location of the dump truck need not always be the GPS receiver 30; it is also practicable to configure a system that identifies the self-location by use of radio from a plurality of base stations arranged on the ground, for example. In such a configuration, the GPS receiver 30 is an antenna for this system. Also, means of detecting berms need not always be the laser radar sensors 31 and 32; it is also practicable to use means in which a camera is used to detect berms through image processing. In such a case, the laser radar sensors 31 and 32 are cameras mounted such that these cameras look down the sides of the vehicle. The means of detecting obstacles ahead need not always be the millimeter-wave radar sensor 33; it is also practicable to use a stereo camera. In such a configuration, the stereo camera is mounted in the front of the vehicle instead of the millimeter-wave radar sensor 33. The stereo camera may be mounted further above the position of the millimeter-wave radar sensor 33 shown in the figure so as to look down at the ground.

Figure 3:
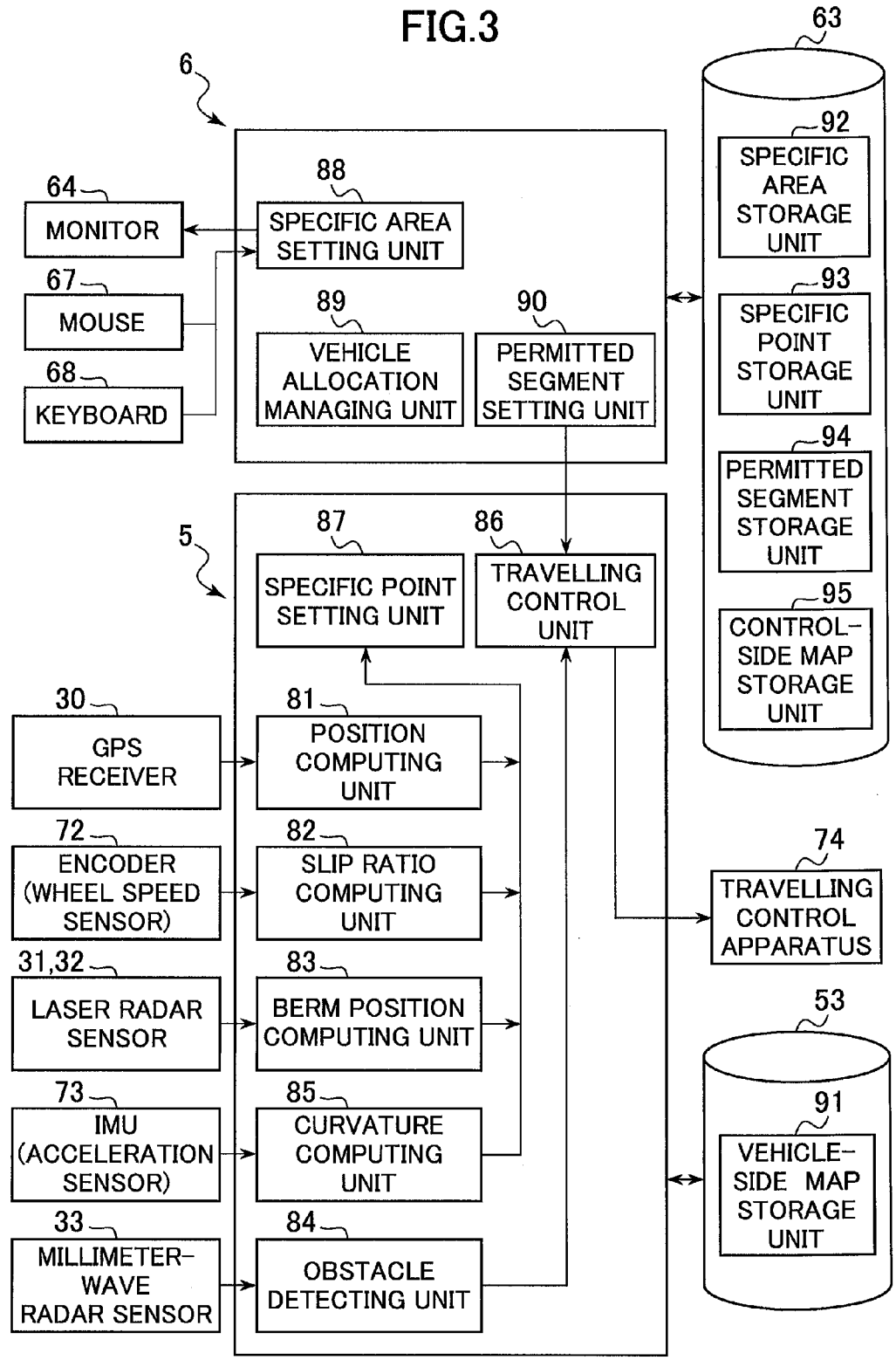
FIG. 3 is a functional block diagram mainly illustrating computers 5 and 6 according to the first embodiment of the present invention.

With reference to FIG. 3, there is shown a block diagram mainly illustrating the functions of the computers 5 and 6 according to the first embodiment of the present invention. The CPU 61 of the control-side computer 6 functions as a vehicle allocation managing unit 89 for determining a destination and track road thereto of each dump truck 1, a specific area setting unit 88 for providing control such that a plurality of dump trucks 1 will not touch each other, and a permitted segment setting unit 90. The storage area of the HDD 63 stores a specific area storage unit 92, a specific spot storage unit 93, a permitted segment storage unit 94, and a control-side map storage unit 95 in which the information on track roads of a mine site on which each dump truck travels is stored.

The CPU 51 of the vehicle-side computer 5 functions as a position computing unit 81, a slip ratio computing unit 82, a berm position computing unit 83, an obstacle computing unit 84, a curvature computing unit 85, a specific spot setting unit 87, and a travel control unit 86. The position computing unit 81 is for computing the position of the vehicle on the basis of an output from the GPS receiver 30. The slip ratio computing unit 82 is for computing a slip ratio on the basis of a difference between a vehicle speed estimated from a time change of a host vehicle position obtained by the position computing unit 81 and a speed of the drive wheel obtained from an output of the encoder (the wheel speed sensor) 72. The berm position computing unit 83 is for computing the distance from the host vehicle to the berms of both sides of the track road on the basis of a detected value obtained by the laser radar sensors 31 and 32. The obstacle computing unit 84 is for detecting obstacles present ahead of the host vehicle on the basis of a detected value obtained by the millimeter-wave radar sensor 33. The curvature computing unit 85 is for computing the curvature of a curve by computing a centrifugal force, acting on the vehicle at the time of curve traveling, on the basis of an output value of the IMU 73. The specific spot setting unit 87 is for setting specific spots on the basis of the results of computation of the position computing unit 81, the slip ratio computing unit 82, the berm position computing unit 83, and the curvature computing unit 85. The travel control unit 86 is for determining movement of the dump truck in accordance with commands from the control-side computer 6 and the information supplied from various sensors. The storage area of the HDD 53 has a vehicle-side map storage unit 91 for storing the information on the track roads in the mine site in which the dump truck travels. The output of the travel control unit 86 is entered in the travel control unit 74 that controls acceleration, deceleration, and steering of the dump truck.

Figure 4:
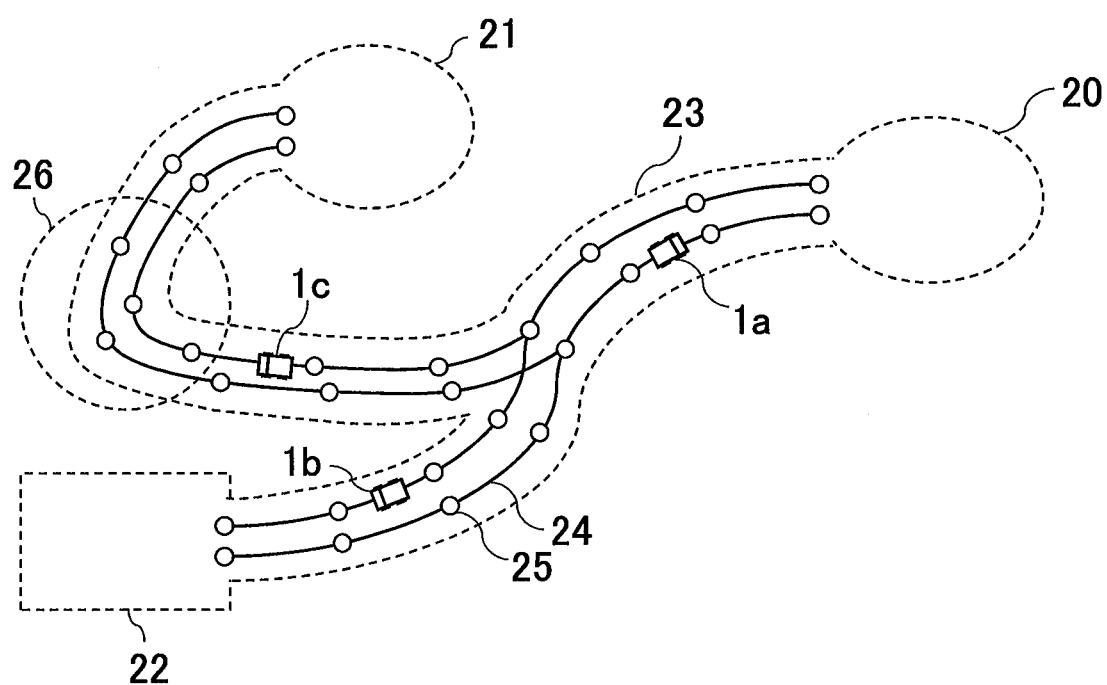
FIG. 4 is an exemplary configuration of an open-pit mine site on which dump trucks travel.

With reference to FIG. 4, there is shown an exemplary configuration of an open-pit mine site in which dump trucks travel. In FIG. 4, an area indicated by reference number 20 is an excavation site where a hydraulic excavator (not shown) or the like is employed, the excavation site being a site where the topsoil and ores excavated by the hydraulic excavator are loaded onto dump trucks. An area indicated by reference number 21 is a dumping site 21 where the topsoil and the like carried from the excavation site 20 are dropped to be developed in a layer or radial manner. An area indicted by reference number 22 is a dumping site where crusher (not shown) for crushing ores is installed, the crushed ores being transferred to a loading place where freight cars use or processing facilities by belt conveyors or the like. The excavation site 20, the dumping site 21, and the dumping site 22 are interconnected by a transport path 23 that enables the traveling of dump trucks and the like. For example, three dump trucks 1a, 1b, and 1c each pick up topsoil or ores at the excavation site 20, travel on the direction key 23, and carry the topsoil or cores to the dumping site 21 or the dumping site 22.

To the transport path 23, a track road 24 on which each dump truck travels in an autonomous traveling mode is set, the dump truck traveling along the track road 24. The track road 24 is defined by a set of coordinate values (point group data) set to the map. The dump truck travels in an unattended manner along the track road 24 by controlling acceleration, deceleration, and steering while making comparison between the host vehicle position obtained through the GPS receiver 30 and the coordinate values of the track road 24 allocated to the host vehicle.

Each track road 24 is divided into a plurality of roads along the extension direction thereof. Each divided area is herein referred to as "segment." The boundaries of both ends of one segment with other segments are referred to as nodes. In the example shown in FIG. 4, a plurality of circular shapes 25 arranged on each track road 24 are nodes. Each segment can be defined by the two nodes 25 located at both ends of each segment. There is no limitation to the length of each segment; the lengths of all segments may be equal to each other or the lengths may be different partially or totally.

The information on each track road 24 and the information on the node 25 (namely, the information on segments included in the track road 24) are stored in the control-side map storage unit 95 of a control station 2 and in a vehicle-side map storage unit 91 of the dump truck 1 as the same map data.

The control-side computer 6 allocates only a part of the segments of the track road 24 allocated to each dump truck as segments on which the dump trucks can travel. The dump trucks are configured not to be able to travel any segments other than those allocated to the dump trucks. The travelable segment allocated to the respective dump trucks is herein referred to as "traveling permitted segment." Each of the traveling permitted segments consists of one or more segments. If a traveling permitted segment is made up of two or more segments, these segments are supposed to be continuous.

From the viewpoint of avoiding the contact between dump trucks, the permitted segment setting unit 90 of the control-side computer 6 according to the present embodiment allocates a traveling permitted segment to the respective dump trucks in accordance with the track road and positon of the dump trucks, the traveling permitted segment having at least one segment that does not overlap with that of other dump trucks. Moreover, as the dump truck travels on the track road 24, the permitted segment setting unit 90 sequentially sets the segments ahead of the dump truck on the track road 24 as new traveling permitted segments and, at the same time, excludes segments where a predetermined time has elapsed since the dump truck passed the segments (or segments from which a predetermined distance is away) from the traveling permitted segment. The dump truck is then notified of that information. Consequently, the vehicle control system according to the present embodiment realizes the autonomous traveling of dump trucks along the track road 24 without collision of the dump trucks.

Meanwhile, the transport path 23 shown in FIG. 4 is a two-way, two-lane road with a lane and a return-lane arranged in an adjacent manner, the track road 24 being set for each of the two lanes having traffic in both directions. Each dump truck travels on the right-side lane of the transport path 23 and, on the transport path 23 shown in FIG. 4, two-way traffic is practiced along all parts of the transport path, providing a two-way traffic area for all of the transport path 23. It should be noted that an example in which two-way traffic roads are taken is used herein for the purpose of description; the present invention is also applicable to a road consisting of more than two lanes and another more than two lanes in the opposite direction, the lanes being arranged in an adjacent manner. In other words, the present invention is applicable as long as parts where two-way traffic is provided are included in a transport path.

With the two-way traffic transport path as mentioned above, dump trucks traveling on the two lanes having traffic in both directions frequently pass each other, thereby requiring caution not to make contact between the traveling dump trucks at the time of passing. For example, if a sharp curve (the area 26 indicated by a circular dash line shown in FIG. 4 for example) in a transport path is a two-way traffic road, and if a dump truck traveling on the inside lane of the curve (namely, the right-side lane of a sharp curve 26) cannot sufficiently decelerate by the time the dump truck enters the curve, it is highly likely that this dump truck could enter an oncoming lane in the curve to touch a dump truck traveling this oncoming lane. An actual mine has many places where dump trucks possibly enter the oncoming lane, such as slippery road surfaces due to rain fall, causing poor braking, and narrow roads where the road width is not sufficient for safe passing in addition to sharp curves. That is to say, even if traveling permitted segments are set to each dump truck as described above, it is still possible for dump trucks to get out of the set traveling permitted segments. Only the setting of traveling permitted segments does not turn out to be enough for the prevention of collision between dump trucks.

Therefore, in order to solve the problem, the present embodiment has a control station that manages areas in which dump trucks may possibly enter the oncoming lane as with the sharp curve portion 26 in a transport path and controls the traveling of dump trucks so as to prevent the passing in such areas. In order for the control station to manage such areas in which it is possible for dump trucks to enter the oncoming lane as with the sharp curve portion 26, a method of defining these areas will now be described. In what follows, an area managed by the control station is referred to as a "specific area."

A specific area is a closed area that is set over the two lanes having traffic in both directions, the two lanes being a portion (a two-lane traffic area) having two-lane traffic. While one vehicle is traveling in the specific area, other vehicles are not permitted to enter the area. In other words, while a certain vehicle is traveling on one lane (a track road) in a specific area, the other lane (a track road) running on one lane concerned is not permitted to travel in the specific area and the traveling of any other vehicles on the other lane included in the specific area is not permitted as well.

Figure 5:
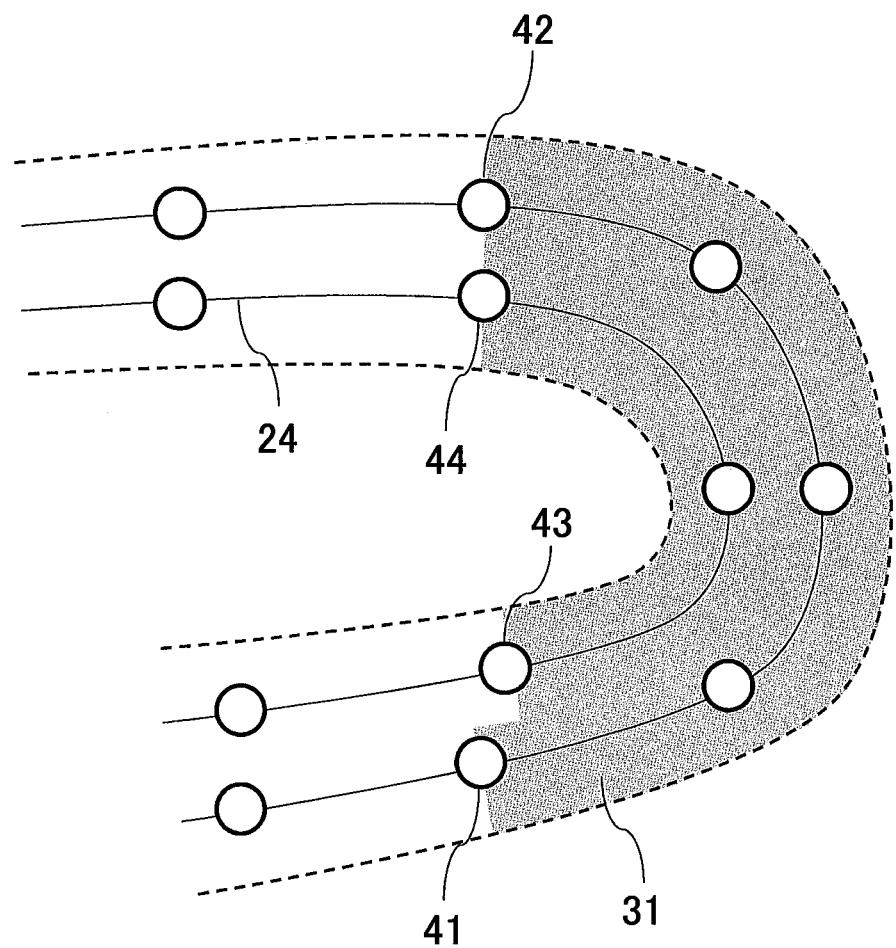
FIG. 5 is a diagram illustrating one example of a sharp curve on a carrying course.

With reference to FIG. 5, there is shown an example of a sharp curve in a transport path. The curve portion of the transport path shown in this figure includes an area 31 set by the control station as a specific area. The specific area is defined by segment. The specific area 31 shown in FIG. 5 is defined as four segments from a node 41 to a node 42 related with one lane of the two-way traffic lanes and two segments from a node 43 to a node 44 related with the other lane. In the present embodiment, each specific area is identified by a unique ID (an area ID) indicative of this area and IDs (node IDs) of two or more nodes related with the area ID, the area ID related with each specific area being stored in the control-side map storage unit 95 in the HDD 63 along with the node IDs related with the area ID. According to this definition, whether a vehicle is present in a certain specific area can be determined by checking if the node ID related with a segment in which the vehicle is present is included in the node ID related with the specific area.

The following describes an operation of the vehicle control system according to the present embodiment. A method of detecting specific spots in a transport path of each dump truck will be now described. In the present embodiment, a dump truck having various sensors 30, 72, 31, 32, and 73 are made to travel on a track road in a mine. On the basis of the output values of these sensors, the vehicle-side computer 5 detects points (referred to as "specific spots") at which the host vehicle possibly enters the other adjacent lane in a two-way traffic area having two-way traffic on the track road.

Herein, the possibility of the host vehicle to enter the other adjacent lane in the two-way traffic area on a track road is quantified (parameterized) on the basis of the detected values of the various sensors 30, 72, 31, and 73 and a comparison is made between the numerals concerned (parameters) and thresholds (a threshold is set to each of the parameters), thereby setting up specific spots. The parameters include a slip ratio of the traveling host vehicle, a curvature of track road, and distances from the host vehicle to both side berms of track road, for example. In the present embodiment, a slip ratio is computed by the slip ratio computing unit 82, a curvature is computed by the curvature computing unit 85, and distances to the berms are computed by the berm position computing unit 83. It should be noted that a vehicle to be run on a track road for detecting specific spots may be a general vehicle (a navigating vehicle) having any of the various sensors 30, 72, 31, 32, and 73 instead of a dump truck under the control of the control station.

Figure 6:
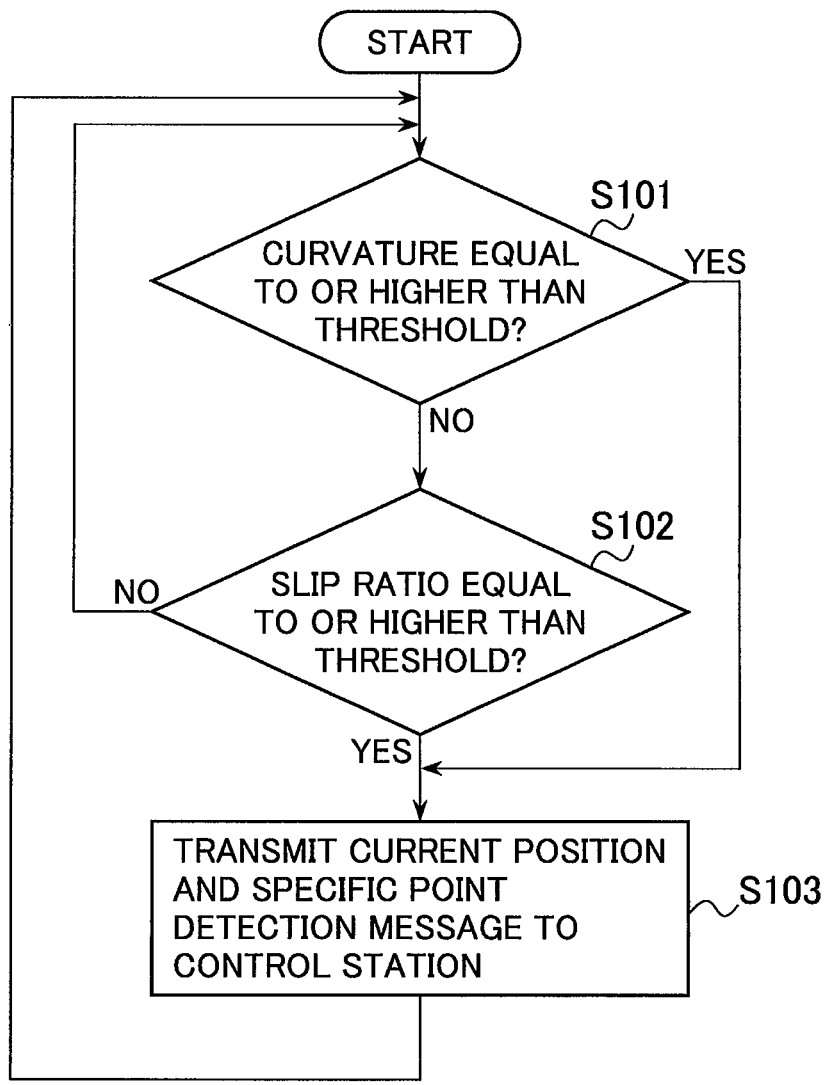
FIG. 6 is flowchart indicative of a specific example of a processing procedure for a vehicle such as a dump truck to collect positional information on a specific spot.

With reference to FIG. 6, there is shown a specific example of a processing procedure for a vehicle such as a dump truck to collect the positional information on specific spots.

When the processing shown in FIG. 6 starts, the curvature computing unit 85 of the vehicle-side computer 5 first estimates the curvature of points at which the vehicle travels, on the basis of the values detected by the IMU 73, every constant time (every GPS period for example). Next, the specific spot setting unit 87 makes a comparison between the estimated curvature and the present thresholds (S101). If the curvature estimated in S101 is lower than the threshold, then the slip ratio computing unit 82 of the vehicle-side computer 5 estimates a slip ratio on the basis of a value output from the encoder 72 and the specific spot setting unit 87 makes a comparison between the slip ratio concerned and the present threshold (S102). If the curvature is found to be lower than the threshold in S102, then the processing returns to S101 to wait until a next time at which curvature is estimated.

If the curvature is found to be higher than the threshold in S101 or S102, then the specific spot setting unit 87 transmits a message indicative of the current position of the vehicle detected by the GPS receiver 30 and the detection of a specific spot at the position concerned to the control station (S103), subsequently repeating the above-mentioned processing.

It should be noted that, for each threshold for use in the decision of S101 and S102, a value in which the entering in the oncoming lane is possible is researched and set in advance. In addition to this procedure, after the distance from the host vehicle to the berm is computed by the berm position computing unit 83 on the basis of the values detected by the laser radar sensors 31 and 32 and a camera mounted on the vehicle, it may be determined whether this distance is lower than the threshold or not instead of one or both of S101 and S102 or added to S101 and S102. Consequently, if this computed distance is lower than the threshold and the current position is a place where the road width is not enough for letting the oncoming vehicle pass, then the processing goes to S103 as with the above-explained processing, thereby transmitting the current position and a specific spot detection message to the control station.

Receiving the positional information on specific spots transmitted by the vehicle-side computer 5 through the input/output interface 66 in S103, the control-side computer 6 stores the positions of the specific spots into the specific spot storage unit 93 in the HDD 63. Consequently, if a specific spot requiring caution for the contact with the oncoming vehicle on the track road is found after starting the operation of the vehicle control system, the information thereof can easily be fed back to the control of each vehicle.

Figure 7:
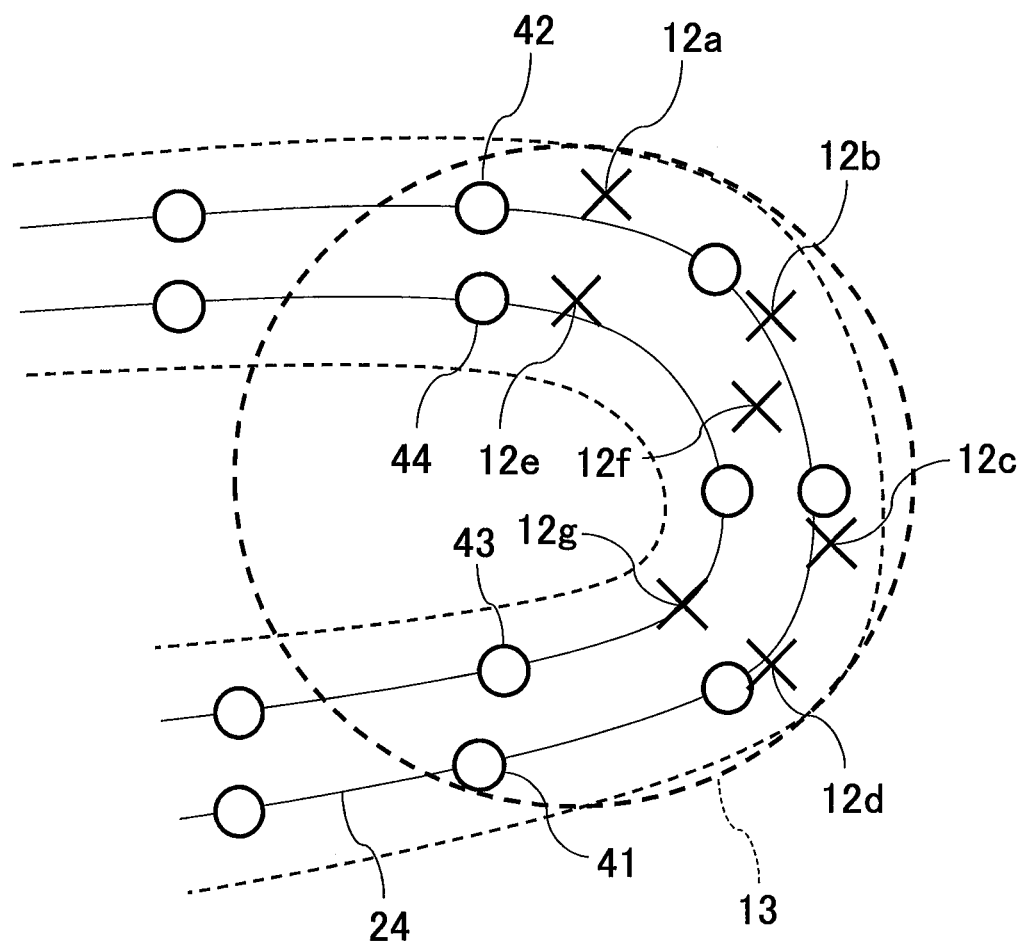
FIG. 7 is a diagram illustrating a part of display screen of a monitor 64 of the control-side computer 6.

Further, in the present embodiment, a specific area is set in the specific area setting unit 88 of the control-side computer 6 by use of the collected positional information and the like of specific spots. The following describes a method of this setting. Specific area setting methods include a method in which the setting is done with the control-side computer 6 by use of input devices such as the mouse 67 and the keyboard 68 that are operated by an operator in the control station. FIG. 7 shows a part of a display screen of the monitor (display unit) 64 of the control-side computer 6, in which an overhead view of track roads of dump trucks is displayed.

X marks 12a through 12f shown in FIG. 7 are indicative of the positions of specific spots detected by the specific spot setting unit 87 and stored in the specific spot storage unit 93. As a result of seeing the positions of specific spots displayed on the monitor 64, the operator sets a specific area over the adjacent two lanes having two-way traffic. In the method of setting the specific spot, the operator selects given nodes on two adjacent track roads having two-way traffic on the basis of the positional information on specific spots displayed on the monitor 64. The operator then sets a specific area on a segment defined by these selected nodes. The method of selecting nodes related with a specific area includes drawing a circle 13 with the use of the input units 67 and 68 over the adjacent two track roads, thereby setting a segment defined by the nodes found inside this circle 13 as a specific area. At this moment, an ID (a specific area ID) is automatically allocated to the newly set specific area, the specific area ID being stored in the specific area storage unit 92 along with end point node IDs.

It should be noted that node selection is done with the circle 13, but it is also practicable to use another figure such as rectangle for the selection or click the nodes located at both ends of a segment to be set as a specific area, for example. It is also practicable the segments on the track road on which specific spots are present may be colored through software processing and displayed on the screen so as to allow the user to easily select areas.

Meanwhile, in order to examine the cancel of the setting for a segment once set as a specific area, the following processing may be executed in addition to the above-mentioned processing. First, when the host vehicle is traveling, the specific spot setting unit 87 of the vehicle-side computer 5 constantly executes the processing of detecting specific spots shown in FIG. 6. The parameter values thereof and the detected position will accordingly be transmitted to the control-side computer 6 even when the slip ratio or a curvature is under the threshold. Then, the specific area setting unit 88 of the control-side computer 6 is configured to give, through the monitor 64 or the like, information on whether specific spots have been detected in a specific area. This allows the operator to easily determine whether a specific area has been properly selected at the present moment, thereby easily finding out the positions where it is unnecessary to pay attention to the contact with the oncoming vehicles, resulting in an easy feedback of the information thereof to the control of each vehicle.

In the case, an operation that, after the elapse of a predetermined time, the positional information on the specific spots thereafter is not displayed on the monitor 64 allows the operator to easily recognize a deviation between the specific area setting time relative to the appearance of specific spots and the current point of time. Consequently, if none of the specific spots appears in the currently set specific area, the operator may cancel the setting of the specific area in the segment concerned.

It should be noted that, in the above, an example where the operator cancels a specific area has been described; however, it is also practicable the specific area setting unit 88 automatically cancel a specific area in accordance with the appearance frequency of specific spots inside the specific area as with the specific area setting processing described above.

The following describes the travel control of dump trucks that is executed in the vehicle control system according to the first embodiment of the prevent invention.

Figure 8A:
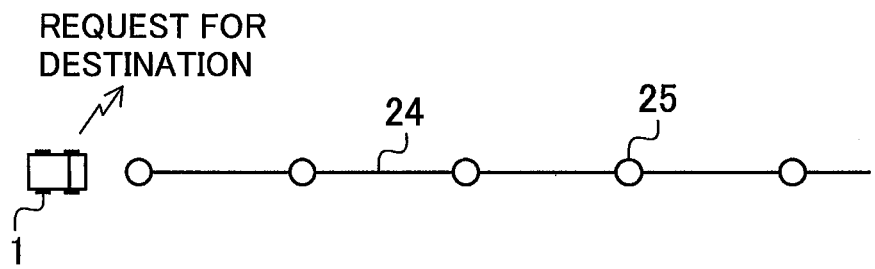
FIGS. 8A, 8B and 8C are diagrams illustrating travel control a dump truck is subjected to in the vehicle control system according to the first embodiment of the present invention.

First, as shown in FIG. 8A, a dump truck 1 transmits a message to a control station 2 requiring for a next destination upon completion of the loading of topsoil or ores at the excavation site 20 shown in FIG. 4 or soil discharging at the dumping site 21 or the dumping site 22. This message is transmitted through the communication interface 55 when the travel control unit 86 of the vehicle-side computer 5 has determined a current situation of the dump truck 1 (namely, whether the loading or discharging of operation has been completed).

Figure 8B:
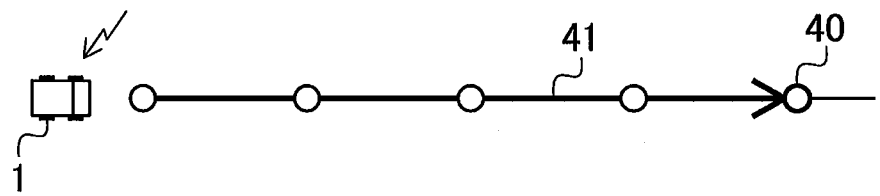

The message transmitted from the dump truck 1 is received by the control-side computer 6 to be transmitted to the vehicle allotment managing unit 89. Taking the situations of other trucks into account, the vehicle allotment managing unit 89 determines a next destination and a track road running thereto for the dump truck 1 that requested a next destination. The vehicle allotment managing unit 89 then transmits the determined next destination the track road thereto to the dump truck 1 through the communication interface 65. Here, it is assumed that a destination 40 and a track road 41 shown in FIG. 8B respectively are set as the new destination of the dump truck 1 and the track road thereto.

Figure 8C:
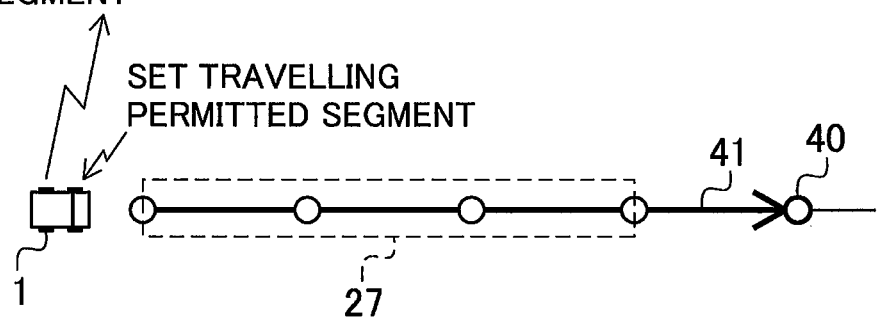

Then, the travel control unit 86 transmits a message (a traveling permitted segment request) for requesting the control-side computer 6 for a traveling permitted segment. The control-side computer 6 transmits this message to the permitted segment setting unit 90. On the basis of the current position and the track road 41 of the dump truck 1, the permitted segment setting unit 90 sets a traveling permitted segment 27 to a part of the track road 41 as shown in FIG. 8C and transmits a message for setting this traveling permitted segment 27 to the dump truck 1. Only upon the acquisition of a traveling permitted segment as described above, the dump truck 1 can start traveling. As described above, as a dump truck moves, the traveling permitted segments set to the dump truck change. For example, when the dump truck moves forward on the track road 41 and a new segment is set as a traveling permitted segment, the segment in which the dump truck 1 has passed is canceled from the traveling permitted segments.

Information on which segment (each segment can be defined by the IDs of two nodes at both ends of each segment) of a mine track road is set as a traveling permitted segment for which dump truck is stored in the control-side map storage unit 95 of the control-side computer 6. Referring to this information, the permitted segment setting unit 90 of the control-side computer 6 sets a traveling permitted segment for each dump truck on the basis of a traveling permission request from each dump truck such that no overlap setting occurs. Meanwhile, by recording a traveling permitted segment received from the control-side computer 6 to the vehicle-side map storage unit 91, the vehicle-side computer 5 determines a segment in which the host vehicle can travel.

It is also practicable to provide a configuration in which the records of the setting situations of traveling permitted segments for dump trucks are managed by the permitted segment setting unit 90 and the travel control unit 86 of each dump trump instead of the control-side map storage unit 95 of the control station and the vehicle-side map storage unit 91 of each dump truck as described above.

Figure 9:
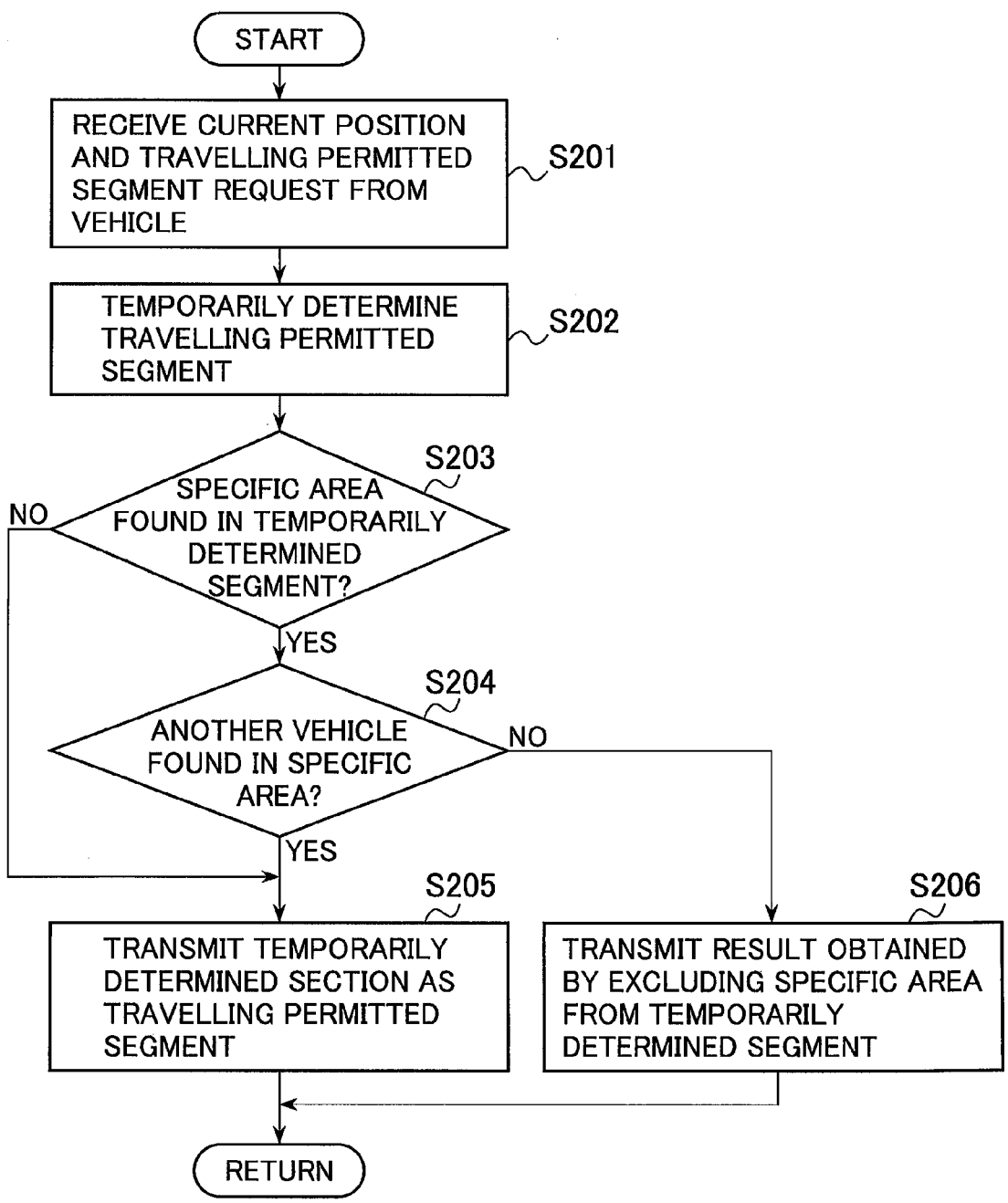
FIG. 9 is a flowchart indicative of processing by the control-side computer 6 according to the first embodiment of the present invention for controlling the entry of a vehicle into a specific area by setting a traveling permitted segment.

The following describes, with reference to FIG. 9, a method of controlling the entry of vehicles into a specific area by the control-side computer 6 so as to prevent the passing between vehicles in the specific area.

With reference to FIG. 9, there is shown a flowchart indicative of the processing of controlling the entry of vehicles into a specific area by setting a traveling permitted segment with the control-side computer 6 according to the first embodiment of the present invention. As shown in the figure, when predetermined conditions are satisfied, the control-side computer 6 first receives a request message (a traveling permitted segment request) for requesting a traveling permitted segment transmitted from the vehicle-side computer 5 of the dump truck 1 and positional information on the dump truck 1 transmitted along with this request message (S201). It should be noted that conditions under which a traveling permitted segment request is transmitted from the vehicle-side computer 5 include a case in which the distance from the current position of a dump truck to the end of a currently provided traveling permitted segment gets below a certain value, for example. The case shown in FIG. 6(c) is also included in these conditions.

On the basis of a vehicle position received in S201, the permitted segment setting unit 90 temporarily determines the traveling permitted segment of the dump truck 1 onto the track road (S202). This temporarily determined segment is determined in accordance with predetermined rules (a combination of the segment in which the vehicle is present and the predetermined number of segments on the track road located before and after the vehicle advancing direction from this segment is set as a temporarily determined segment while avoiding overlapping with other vehicles, for example) without a specific area taken into consideration.

Next, the permitted segment setting unit 90 makes a comparison between the temporarily determined segment determined in S202 and the position of the specific area stored in the specific area storage unit 92 to determine whether there is a specific area in the temporarily determined segment (S203).

If no specific area is found in S203, then, the temporarily determined segment of S202 is transmitted to the dump truck 1 as a traveling permitted segment (S205), after which the processing returns to S201. On the contrary, if the specific area is found in S203, then it is determined whether there is any other vehicle traveling in the specific area (S204).

If no other vehicles are found traveling in the specific area in S204, the temporarily determined segment of S202 is transmitted to the dump truck 1 as a traveling permitted segment (S205) and the processing returns to S201. On the contrary, if another vehicle is found traveling in the specific area in S204, then the segment with the specific area excluded from the temporarily determined segment of S202 is transmitted as the traveling permitted segment of the dump truck (S206), and the processing returns to S201.

It should be noted that, if there are a plurality of specific areas in the temporarily determined segment of S202, it is determined in S204 whether other vehicles are present in all specific areas in S204. After that, a segment with only specific areas in which other vehicles are found excluded from the temporarily determined segment may be transmitted as the traveling permitted segment of the dump truck 1 in S206.

As described above, the dump truck 1 that has received the traveling permitted segment transmitted from the control-side computer 6 travels the traveling permitted segment set to the host vehicle while referring to the map data of the host vehicle stored in the vehicle-side map storage unit 91 and the information on obstacles ahead of the vehicle transmitted from the obstacle computing unit 84.

It should be noted that, in the above-mentioned processing, a method has been described in which, if no other vehicles are determined to be present in a specific area in S204, the specific area is set as a traveling permitted segment. However, from the viewpoint of securely preventing the passing each other in a specific area, a method is preferably employed in which, if a vehicle is estimated to enter any one of specific areas within a predetermined time or within a certain distance, the specific area is set for the vehicle to a traveling permitted segment in advance. In this segment, because it is required to estimate future vehicle positions, the control-side computer 6 must receive the current speed data from the vehicle in S201 as well. In other words, it is required for the vehicle-side computer 5 to transmit the current speed of the vehicle along with a traveling permitted segment request.

According to the processing described above, areas in which there is a possible contact between vehicles such as dump truck in sharp curves, slippery road surfaces, or the like are managed by the control station as specific areas. When a certain dump truck has entered (or is estimated to enter) a certain specific area, the specific area is set only for this dump truck as a traveling permitted segment, so that, during this period, other dump trucks are not permitted to travel in the specific area. Consequently, the vehicles' traveling can be controlled so as to always permit only one vehicle to enter a specific area, thereby preventing the passing each other in a specific area that involves a possible contact with oncoming vehicles.

Further, in the present embodiment, there is no need for excessively decelerating a vehicle in a specific area to prevent the vehicle from entering the oncoming lane, thereby enhancing operation efficiency. Moreover, according to the present embodiment, on the basis of the information collected from actually traveling a plurality of vehicles, points that are high in possibility of the contact with oncoming vehicles due to the shape or ease of slip of a track road can be determined among the track roads, thereby reducing the possibility of the contact with oncoming vehicles even if track roads or weather changes.

Second Embodiment

The second embodiment of the present invention shows a method in which the passing with oncoming vehicles is prevented by setting all segments of a specific area including the oncoming lane in addition to the traveling lane of the host vehicle to traveling permitted segments. It should be noted that the description of the portions in the second embodiment that are similar to those of the first embodiment is omitted including the system configuration.

Figure 10:
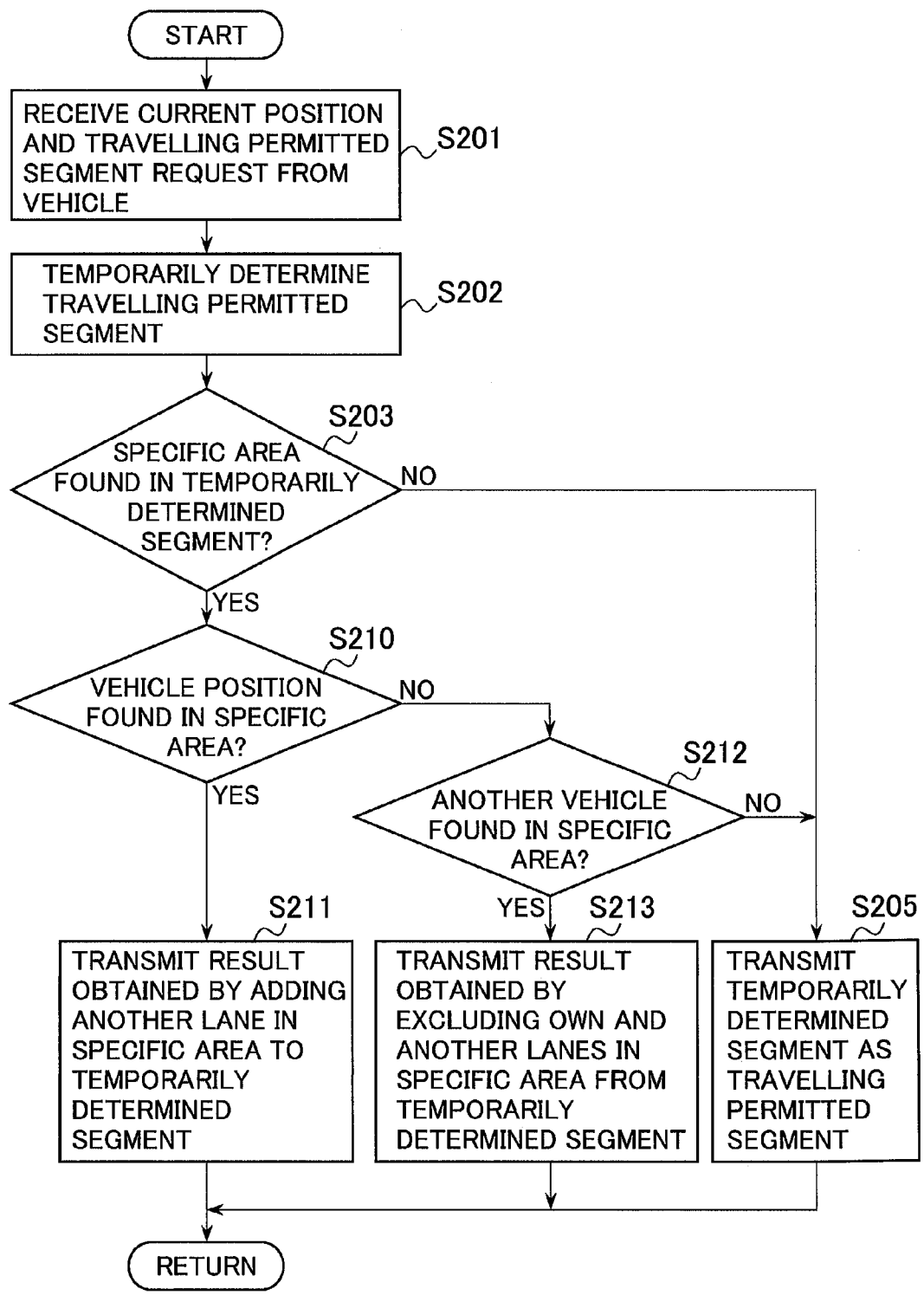
FIG. 10 is a flowchart indicative of processing by a control-side computer 6 according to second embodiment of the present invention for controlling the entry of a vehicle into a specific area by setting a traveling permitted segment.

With reference to FIG. 10, there is shown a flowchart indicative of the processing of controlling the entry of a vehicle into a specific area by setting a traveling permitted segment by the control-side computer 6 according to the second embodiment of the present invention. The processing operations in S201 through S203 and S250 are substantially the same as those shown in FIG. 9 and therefore the description thereof is omitted.

In S210, a permitted segment setting unit 90 of a control-side computer 6 makes a comparison between a vehicle positions received in S201 and a vehicle position included in a temporarily determined segment of specific areas stored in a specific area storage unit 92 so as to determine whether a dump truck 1 is present in a specific area in the temporarily determined segment.

When the dump truck 1 is found in the specific area in S210, the permitted segment setting unit 90 transmits a segment obtained by adding the segment of the other lane included in the specific area to the temporarily determined segment set in S202 to the dump truck 1 as a traveling permitted segment. In other words, all segments related with the two lanes having traffic in both directions, the segments being included in the specific area, are set as the traveling permitted segments of the dump truck 1. For example, if the dump truck 1 is traveling on the right-side lane in the specific area shown in FIG. 5, in addition to four segments from node 41 to node 42 related with this right-side lane, two segments from node 43 to node 44 related with the left-side lane are set as a traveling permitted segment (S211). Then, upon completion of the processing in S211, the processing returns to S201 to repeat the subsequent processing.

On the contrary, when the dump truck 1 is not found in the specific area in S210, then the permitted segment setting unit 90 makes a comparison between the position of each vehicle transmitted at a predetermined interval from a vehicle-side computer 5 mounted on each vehicle and the position of the specific area included in a temporarily determined segment of S203 so as to determine whether other dump trucks than the dump truck 1 are present in the specific area in the temporarily determined segment (S212).

When another vehicle is found in the specific area in S212, the permitted segment setting unit 90 transmits a segment obtained by excluding the segment of the own lane and the other lane included in the specific area from the temporarily determined segment set in S202 to the dump truck as a traveling permitted segment. In other words, all segments related with the two lanes having traffic in both directions, the segments being included in a specific area, are excluded from the traveling permitted segment of the dump truck 1 (S211). Then, upon completion of the processing in S221, the processing returns to S201 to repeat the subsequent processing.

On the contrary, if no other vehicle is found in the specific area in S212, the temporarily determined segment in S202 is transmitted to the dump truck 1 as a traveling permitted segment (S205), after which the processing returns to S201.

It should be noted that, if there are a plurality of specific areas in the temporarily determined segment of S202, then whether other vehicles are present in all specific areas may be determined in S212 and a segment obtained by excluding only a specific area in which other vehicles are present from the temporarily determined segment may be transmitted as the traveling permitted segment of the dump truck 1.

According to the present embodiment configured as described above, while a vehicle is traveling in a certain specific area, not only the lane on which the vehicle is traveling in the specific area but also the oncoming lane in the specific area is set as a traveling permitted segment for the vehicle. Consequently, the entry of the vehicle into the oncoming lane is permitted in the specific area, so that the vehicle can easily return to the original lane even when entering the oncoming lane. In addition, because the entry into the oncoming lane in a specific area is permitted in the present embodiment, the traveling speed can be increased as compared with that in a method in which only the lane on which the host vehicle is traveling is set as a traveling permitted segment of the host vehicle. The operational efficiency can be improved accordingly.

Third Embodiment

In the present embodiment, an example is shown in which the passing with oncoming vehicles in a specific area is prevented by way of vehicle speed control. It should be noted that the description of the portions similar to those of the first embodiment will be omitted including a system configuration.

Figure 11:
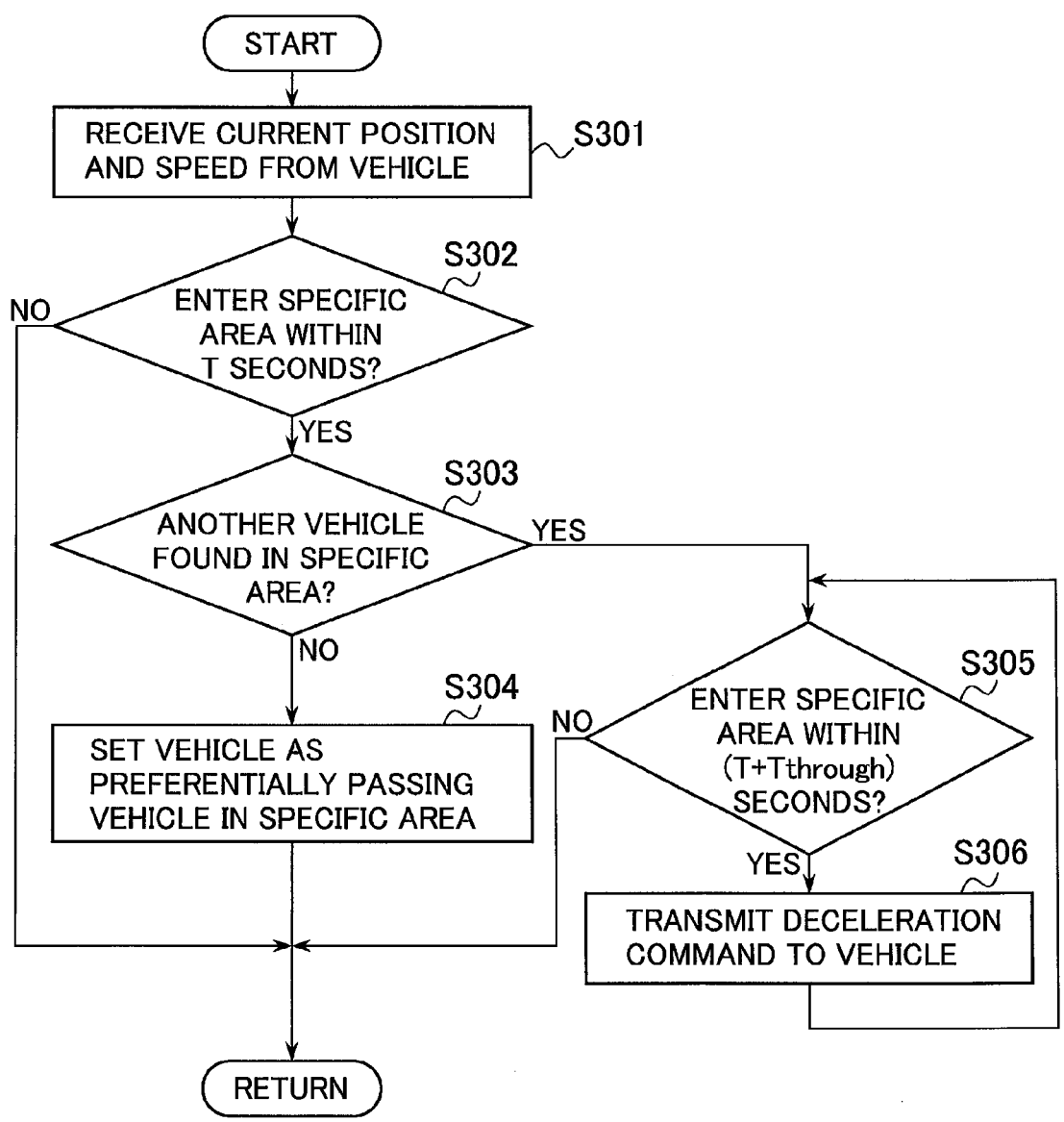
FIG. 11 is a flowchart indicative of processing by a control-side computer according to a third embodiment of the present invention for controlling the entry of a vehicle into a specific area by speed control.

With reference to FIG. 11, there is shown a flowchart indicative of the processing of the control-side computer 6 controlling the entry of a vehicle into a specific area by means of speed control, the control-side computer 6 being according to the third embodiment of the present invention. As described with reference to FIG. 8C, with the present embodiment, it is assumed that a traveling permitted segment has been appropriately allocated to each vehicle on the basis of the host vehicle position and a traveling permitted segment request and, as with the first and second embodiments, the processing of excluding a specific area from a traveling permitted segment has not been executed. In addition, it is assumed that, from each traveling vehicle, the current position and speed thereof are transmitted at a predetermined interval.

First, the control-side computer 6 receives information on the current position (host vehicle position) and speed from a dump truck 1 (S301). Next, from the information on the vehicle position and speed received In S301 and the information on map data stored in a control-side map storage unit 95, the control-side computer 6 estimates a future traveling position of the dump truck 1 and determines whether the dump truck 1 is to enter any one of specific areas within a predetermined time ("T seconds" here) from the execution time (current time) of S302 (S302).

If the entry into any one of specific areas is not estimated in S302, the processing returns to S301 to wait for the communication from the dump truck 1 again. On the contrary, if the entry into any one specific area is estimated in S302, then it is determined whether there is any other vehicle permitted to preferentially pass the specific area (hereafter sometimes referred to as a "preferentially passing vehicle") (S303).

If no preferentially passing vehicle is found in S303, then the dump truck 1 itself that made communication in S301 is set as the preferentially passing vehicle in the specific area (S304), after which the processing returns to S301. On the contrary, if a preferentially passing vehicle of the specific area has already been set in S303, then it is determined whether the dump truck 1 enters the specific area within T+Tthrough seconds with the current speed maintained (S305). It should be noted that "Tthrough (second)" is a time (seconds) set as a guide for a time required for each vehicle to pass through a specific area at a predetermined speed and is stored in the specific area storage unit 92 by being related with each specific area on a transport path. A time required for each vehicle to pass is set to each segment making up a transport path, so that, by totaling the time on the basis of the segments included in the specific area, Tthrough can be computed. Consequently, each preferentially passing vehicle will have passed the specific area in (T+Tthrough) seconds at the latest after the execution time of S302.

If the entry of the dump truck 1 into the specific area within (T+Tthrough) seconds after the execution of S302 is estimated in S305, the control-side computer 6 transmits a deceleration command to the dump truck 1 (S306). Once the dump truck 1 has been decelerated, it is determined again whether the dump truck 1 is to enter the specific area within T+Tthrough seconds after the execution of S302 with the speed concerned maintained (S305). Then, if necessary, further deceleration of the dump truck 1 is executed (S306), thereby repeating the processing of S305 and S306 until the speed of the dump truck 1 reaches a value at which dump truck 1 will not enter the specific area within $T_+$Tthrough seconds.

If the entry of the dump truck 1 into the specific area within (T+Tthrough) seconds after the execution of S302 is not estimated in S305, the occurrence of a situation in which two vehicles are present in the specific area at the same time is prevented, after which the processing returns to S301 to wait for the communication from the dump truck 1 again.

It should be noted that, in the example shown in FIG. 11, a deceleration command is transmitted to the dump truck 1 in S306 from the viewpoint of avoiding the lowering of operational efficiency as little as possible; however, it is also practicable to provide a configuration in which a stop command is transmitted instead of a deceleration command so as to prevent the dump truck 1 from entering the specific area within T+Tthrough seconds. It should also be noted that the time (T+Tthrough seconds) used for the determination in S305 is illustrative only, so that any other time may be used as long as the situation in which a plurality of dump trucks are present at the same time in the specific area is avoided.

In the processing described above, the travel control related with one (dump truck 1) of a plurality of dump trucks has been described. However, the control-side computer 6 is assumed to perform the similar processing on other dump trucks at predetermined intervals.

According to the processing described above, a preferentially passing vehicle is set to the specific area and the speed of other vehicles is controlled so as not to enter the specific area until at least the preferentially passing vehicle has passed the specific area. Consequently, vehicles' traveling can be controlled such that only one vehicle can enter the specific area, thus preventing the passing each other that involves possible contact between vehicles in the specific area.

Fourth Embodiment

It is assumed that, in the present embodiment, the specific spot setting unit 87, the slip ratio computing unit 82, and curvature computing unit 85 in the first through third embodiments are arranged on the control-side computer 6. The curvature computing unit 85 computes the curvature of a track road from a map stored in the control-side map storage unit 95, and the slip ratio computing unit 82 computes the slip ratio from a curvature computed by the curvature computing unit 85. In this configuration, the specific spot setting unit 87 determines whether each position on a track road on the map stored in the control-side map storage unit 95 is a specific spot through the procedure shown in FIG. 6. A threshold for use in the determination of a specific spot is a value including a wider range than those of the first through third embodiments with fluctuations of slip on an actual track road taken into consideration. Thus, the specific spots may be detected only by the shape of a track road stored in the map, with no use of sensors installed on the vehicle. This configuration slightly increases the number of specific spots yet enables substantially the same control as that realized by special sensors mounted on the vehicle.

Meanwhile, as shown in FIG. 7, in each of the embodiments, examples in which an operator manipulates the keyboards 67 and 68 on the basis of the positional information on specific spots displayed on the screen of the monitor 64 has been described; however, it is also practicable to execute the processing of automatically setting the specific area to the specific area setting unit 88 of the control-side computer 6. This processing includes following procedures: the information on time at which specific spots were detected on the basis of the sensors 30, 72, 31, 32, and 73 is stored for each segment into the specific spot storage unit 93 beforehand; it is determined whether the appearance frequency of a specific spot in each segment (the number of times specific spots are detected within a predetermined time) exceeds a threshold; and following two segments are automatically set as specific areas, the two segments being: (1) a segment in which the threshold was exceeded; and (2) a segment (hereafter sometimes referred to as "oncoming segment") arranged beside the segment in which oncoming vehicles travel. It should be noted that the time at which a specific spot was detected may be transmitted from each vehicle-side computer 5 or may be a time at which a specific spot detection message (refer to FIG. 6) was received by the control-side computer 6.

Figure 12:
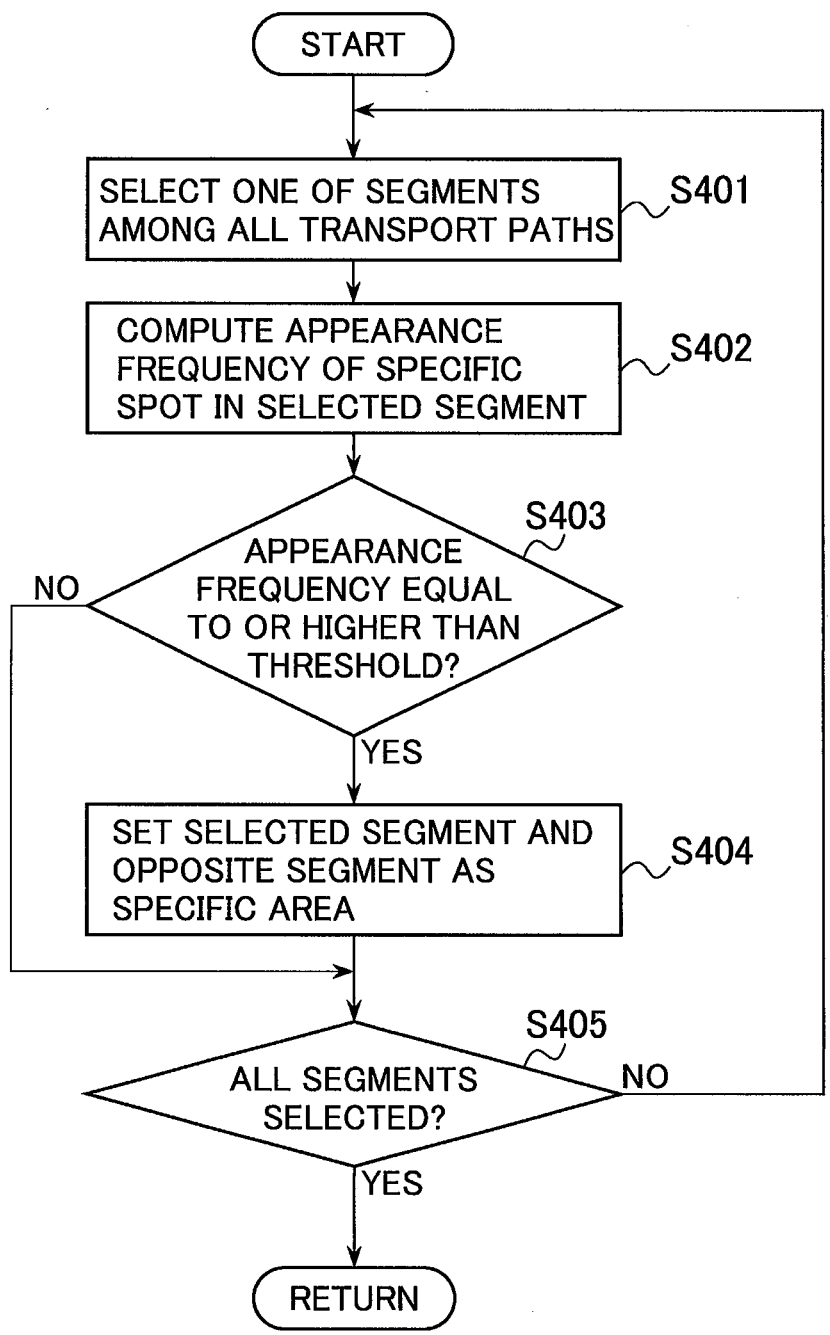
FIG. 12 is a flowchart indicative of processing for the control-side computer 6 to automatically set a specific area.

With reference to FIG. 12, there is shown a flowchart indicative of the processing of automatically setting the specific area by the control-side computer 6. The specific area setting unit 88 executes a sequence of processing operations shown in FIG. 12 at a predetermined interval. When the processing shown in FIG. 12 is started, the specific area setting unit 88 first selects any one segment from all segments included in all transport paths in the mine (S401). Then, on the basis of a detection time of a specific spot in the segment stored in the specific spot storage unit 93, the specific area setting unit 88 computes the appearance frequency of the specific spot in the selected segment (S402).

Next, the specific area setting unit 88 determines whether the appearance frequency computed in S402 is higher than the threshold (S403). If the appearance frequency is found to be higher than the threshold in S403, the specific area setting unit 88 sets both the selected segment and the opposite segment (S404) and makes sure if the appearance frequency has been computed to all segments (S405). On the contrary, if the appearance frequency is found to be lower than the threshold in S403, the specific area setting unit 88 makes sure if the appearance frequency has been computed to all segments in the same manner as above (S405). If there are any segments to which appearance frequency has not been computed in S405, the processing returns to S401 to repeat the sequence of processing operations. Meanwhile, if the appearance frequency has been computed to all the segments in S405, the processing comes to an end and the specific area setting unit 88 waits until a next timing of starting a processing.

Thus, the automatic setting of specific spots enhances the speed of the feedback of the information on specific spots to the vehicle control as compared with the configuration in which specific areas are set by the operator in a manual manner.

Further, it is practicable to have the specific area setting unit 88 of the control-side computer 6 execute the processing of automatically canceling the setting of specific areas by use of the substantially the same principle as above. With reference to FIG. 13, there is shown a flowchart indicative of the processing of automatically canceling the setting of specific areas by the control-side computer 6. The specific area setting unit 88 executes a sequence of processing operations shown in FIG. 13 at a predetermined interval. When the processing shown in FIG. 13 is started, the specific area setting unit 88 first selects any one specific area from all specific areas included in all transport paths in the mine (S501). Next, on the basis of a detection time of a specific spot in the specific area stored in the specific area storage unit 92, the specific area setting unit 88 computes the appearance frequency of the specific spot in the specific area (S502). It should be noted that, because the segments for at least two segments for two lanes having traffic in both directions are included in the specific area, it is necessary to compute the appearance frequency of the specific spots for all segments included in the specific area in S502.

Next, the specific area setting unit 88 determines whether the appearance frequency computed in S502 is lower than the threshold (S503). The threshold used in S503 may be the same as the threshold used in S402 shown in FIG. 12. If the appearance frequency is found to be lower than the threshold in S503, the specific area setting unit 88 cancels the setting of the specific area of the specific area (S504) and makes sure if the appearance frequency has been computed to all specific areas (S505). On the contrary, if the appearance frequency is found to be higher than the threshold in S503, the specific area setting unit 88 makes sure if the appearance frequency has been computed to all specific areas in the same manner as above(S505). If there are any specific areas to which appearance frequency has not been computed, the processing returns to S501 to repeat the sequence of processing operations. Meanwhile, if the appearance frequency has been computed to all the specific areas in S505, the processing comes to an end and the specific area setting unit 88 waits until a next timing of starting a processing.

Thus, the automatic canceling of specific spots enhances the speed of the feedback of the information on specific spots to the vehicle control as compared with the configuration in which specific areas are set by the operator in a manual manner.

It is to be noted that the present invention is not limited to the aforementioned embodiments, but covers various modifications. While, for illustrative purposes, those embodiments have been described specifically, the present invention is not necessarily limited to the specific forms disclosed. Thus, partial replacement is possible between the components of a certain embodiment and the components of another. Likewise, certain components can be added to or removed from the embodiments disclosed.

In each of the embodiments, the functions of the vehicle control system according to the present invention are divided as shown in FIG. 3 by the vehicle-side computer 5 mounted on each vehicle and the control-side computer 6 installed in the control station. However, the exemplary configuration shown in FIG. 3 is illustrative only and therefore these functions may be divided in other manners as long as substantially the same advantages are obtained. For example, the specific spot setting unit 87 may be allocated to the control-side computer 6 to transmit the output values of the sensors 30, 31, 32, 72, and 73 mounted on the vehicle to the control-side computer 6, thereby setting specific spots on the side of the control-side computer 6 on the basis of these output values. To be more specific, the blocks including the storage devices shown in FIG. 3 may be arranged anywhere as long as substantially the same advantages as described above can be obtained.

In addition, the configurations of the vehicle-side computers 5 and 6 and the functions and processing of these configurations may be partially or totally realized by hardware (by designing the logics for executing these functions into integrated circuits for example). Further, the configurations of the vehicle-side computers 5 and 6 may be programs (software) for realizing the functions of the vehicle-side computers 5 and 6 by reading and executing the programs through an arithmetic processing unit (a CPU for example). The information on these programs may be stored in a semiconductor memory (including a flash memory and an SSD), a magnetic storage device (including a hard disk drive), or a recording media (including a magnetic disc and an optical disc).

Although the control line and the information line that were considered to be necessary in the above embodiments have been described, not all the lines of the product have been explained. Almost all the configurations of the lines may be considered to be mutually connected.

The description made so far uses an example of a control system for controlling a plurality of dump trucks traveling in a mine. It is also practicable to control a wide range of general vehicles including passenger cars in addition to special purpose vehicles such as dump trucks. Further, it is also practicable to control self-propelled construction machines such as hydraulic excavators and wheel loaders.

What is claimed is:

1. A vehicle control system for controlling a plurality of vehicles traveling along a plurality of track roads, the system comprising:
   a plurality of position detecting sensors installed on each of the plurality of vehicles and configured to detect a position thereof;
   a plurality of parameter detecting sensors installed on each of the plurality of vehicles and configured to detect a parameter indicative of a possibility for a vehicle installed with the position detecting sensor, traveling on one of two adjacent track roads in a two-way traffic area formed by the two adjacent track roads different in vehicle traveling direction, to enter the other of the two adjacent track roads;
   a specific spot setting unit configured to execute, on a basis of positions of the plurality of vehicles output from the plurality of position detecting sensors, parameters output from the plurality of parameter detecting sensors, and thresholds related with the parameter, a process setting positions at which the vehicle is likely to enter the other adjacent track road in the two-way traffic area as specific spots;
   a storage device configured to store positional information on places set as the specific spots by the specific spot detecting unit; and
   a specific area setting unit configured to, while a vehicle of the plurality of vehicles is traveling, set a specific area where traveling of another vehicle of the plurality of vehicles is not permitted, the specific area being a closed area of the two adjacent track roads in the two-way traffic area,
   wherein the plurality of track roads are each divided into a plurality of segments,
   wherein the storage device stores the positional information on the specific spots and the information on a time at which the parameters were detected; and
   the specific area setting unit sets a first segment and a second segment as the specific area,
   wherein a segment of the plurality of segments of one of two adjacent track roads in the two-way traffic area is set as the first segment when a number of times the specific spots are set within the segment within a predetermined period of time exceeds a threshold,
   wherein the second segment is a segment of the plurality of segments of the other of the two adjacent track roads in the two-way traffic area that is adjacent the first segment.

2. The vehicle control system according to claim 1, wherein the parameters include at least one of slip ratios of the plurality of vehicles, curvature of curves of the plurality of track roads, and distances from the plurality of vehicles to berms of the plurality of track roads.

3. The vehicle control system according to claim 2, further comprising:
a traveling permitted segment setting unit configured to execute a process of allocating at least one of the plurality of segments as a traveling permitted segment to each of the plurality of vehicles without overlapping segments of other vehicles in accordance with a track road and a position of each of the plurality of vehicles,
wherein if one of the plurality of vehicles is present in a segment related with one of the two track roads in the specific area among the plurality of segments, the traveling permitted segment setting unit sets the segment related with the one of the two track roads as a traveling permitted segment for the one of the plurality of vehicles; and
wherein the traveling permitted segment setting unit excludes a segment related with the other track road of the two track roads in the specific area among the plurality of segments from a traveling permitted segment of the other vehicles than the one of the plurality of vehicles among the plurality of vehicles.

4. The vehicle control system according to claim 3, wherein the traveling permitted segment setting unit further sets a segment related with the other track road of the two track road in the specific area as a traveling permitted segment for the one of the plurality of vehicles present in a segment related with one of the two track roads in the two-way traffic area.

* * * * *